United States Patent [19]

Langdon et al.

[11] 3,865,535

[45] Feb. 11, 1975

[54] TWO PIECE DIE ASSEMBLY FOR EXTRUDING MICRO-FILAMENTS

[75] Inventors: Roy A. Langdon; Wilfried R. Gerschon, both of Beloit, Wis.

[73] Assignee: Beloit Corporation, Beloit, Wis.

[22] Filed: June 4, 1973

[21] Appl. No.: 366,557

[52] U.S. Cl. .............................. 425/464, 425/382.2
[51] Int. Cl. ................................................ B29f 3/04
[58] Field of Search ................... 425/66, 382.2, 464

[56] References Cited
UNITED STATES PATENTS

| | | | |
|---|---|---|---|
| 2,821,746 | 2/1958 | Bicher, Jr. .......................... | 425/66 X |
| 3,298,062 | 1/1967 | Nicholl ............................ | 425/382.2 X |
| 3,379,811 | 4/1968 | Hartmann et al. ................ | 425/464 X |
| 3,825,380 | 7/1974 | Harding et al. ................... | 425/464 X |

FOREIGN PATENTS OR APPLICATIONS

| | | | |
|---|---|---|---|
| 1,257,128 | 2/1961 | France .................................. | 425/66 |
| 212,297 | 1/1958 | Great Britain ...................... | 425/464 |
| 486,362 | 6/1938 | Great Britain ...................... | 425/72 |

*Primary Examiner*—R. Spencer Annear
*Attorney, Agent, or Firm*—Hill, Gross, Simpson, Van Santen, Steadman, Chiara & Simpson

[57] ABSTRACT

A die adapted for the simultaneous extrusion of a plurality of filaments. The die is formed of a pair of mating halves which are bonded one to the other by a layer of bonding material. The die is especially well adapted for use in the melt blown microfiber process.

8 Claims, 7 Drawing Figures

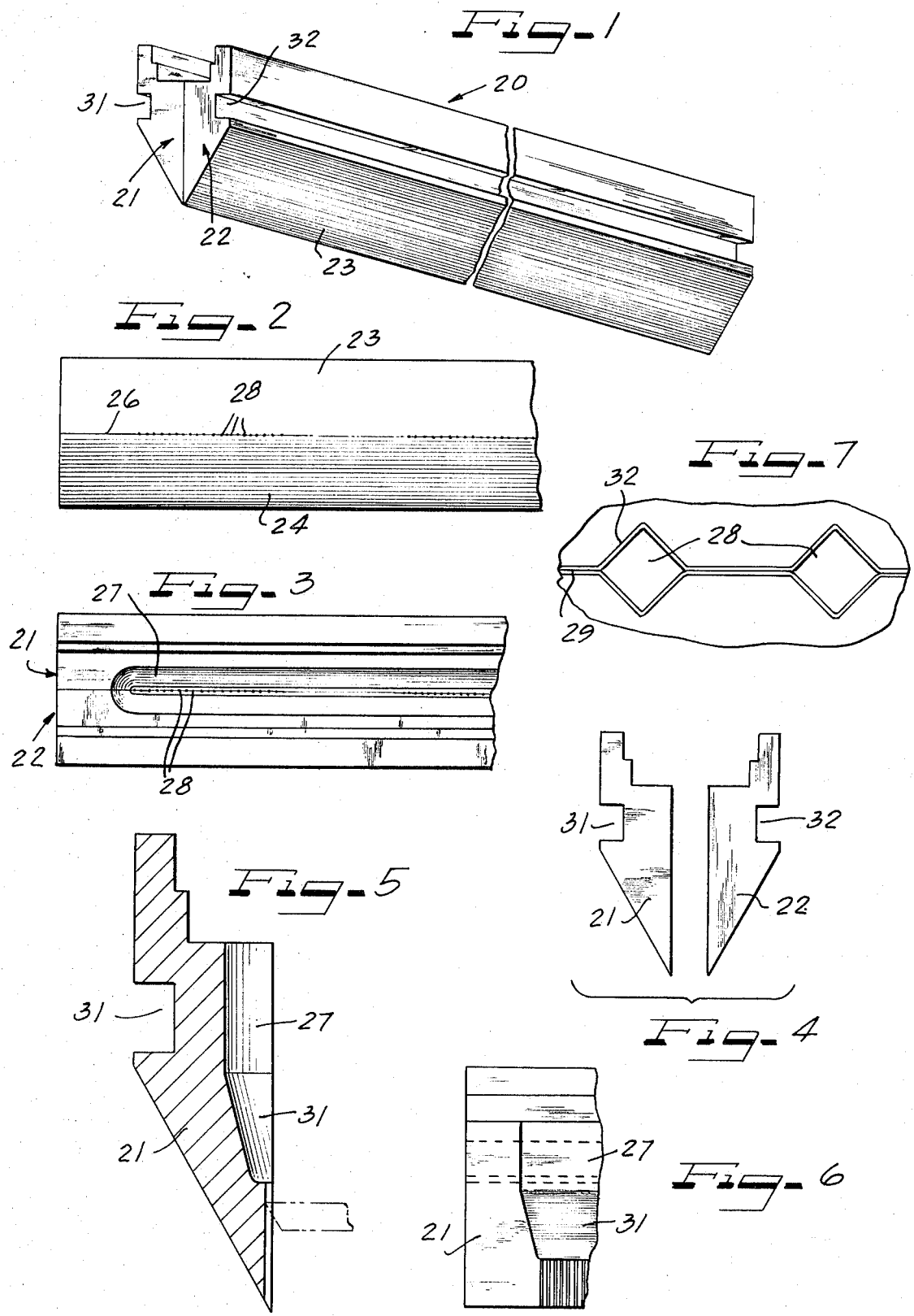

TWO PIECE DIE ASSEMBLY FOR EXTRUDING MICRO-FILAMENTS

BACKGROUND OF THE INVENTION

In the art of making a non-woven mat of melt blown microfibers of thermoplastic polymer, it is necessary to use a die or die-head adapted to produce simultaneously a plurality of small filaments. The fabrication of a die suitable for such a generation of filaments, as those skilled in the art appreciate, has heretofore been a difficult and expensive procedure owing primarily to the problem of producing orifices in a die face having the small diameter and uniformity required for the practice of such technology.

A primary difficulty in fabricating dies for production of microfibers lies in the fact that conventional drills which have the small diameter necessary for tapping orifices of the size desired cannot be used to penetrate the metal used for die manufacture to depths sufficient for die fabrication purposes. Typically, for example, when such a small diameter drill is used to tap a hole beyond four or five times its diameter there is a tendency for the drill to break off in the metal being tapped.

BRIEF SUMMARY OF THE INVENTION

The present invention provides a die structure adapted for the simultaneous extrusion of a plurality of filaments, the filaments having diameters suitable for use in the manufacture of microfibers, for example, microfibers of the type used in the melt blowing process for non-woven mat production.

A primary object of this invention is to overcome the problems of tapping small diameter channels in a die intended for use in extruding filaments, Another object of this invention is to provide a die structure which can be readily fabricated using conventional machining methods in the form of two separate halves which, following appropriate fabrication, are then bonded together to complete the fabrication of the desired die.

Other and further objects of this invention will be apparent to those skilled in the art from a reading of the present specification and claims taken with the drawings.

BRIEF DESCRIPTION OF THE DRAWINGS

In the drawings:

FIG. 1 is a perspective view of one embodiment of a die of this invention, some parts thereof broken away;

FIG. 2 is a bottom plan view of the embodiment shown in FIG. 1, some parts thereof broken away;

FIG. 3 is a top plan view of the embodiment shown in FIG. 1, some parts thereof broken away;

FIG. 4 is an exploded vertical sectional view through the embodiment of FIG. 1 showing the two halves thereof;

FIG. 5 is an enlarged detailed sectional view through one of the halves comprising the embodiment of FIG. 1;

FIG. 6 is a side elevational view longitudinally taken along an end region of the half shown in FIG. 5; and FIG. 7 is an enlarged, detailed, fragmentary, bottom plan view illustrating the appearance of the embodiment of FIG. 1 in the region of the orifices.

DETAILED DESCRIPTION

Turning to the drawings, there is seen an embodiment of a die of this invention which is herein designated in its entirety by the numeral 20. Die 20 is adapted for the simultaneous extrusion of a plurality of filaments as will be explained herein.

Die 20 utilizes a pair of mating halves 21 and 22, respectively. Each half 21 and 22 is formed of metal and each is generally a mirror image of the other. When in an assembled configuration, the halves 21 and 22 define a longitudinally elongated assembly which is characteristic of die 20.

The assembly of halves 21 and 22 defines exteriorly a pair of opposed, tapered die faces 23 and 24, face 23 being on half 22 and face 24 being on half 21. The die faces 23 and 24 terminate in an edge portion 26.

Within the assembly of half 21 and half 22 is a centrally disposed longitudinally elongated chamber 27 which is vertically tapered in its forward region 31. Chamber 27 rearwardly opens in assembled die 20. A portion of the chamber 27 is located in each of the halves 21 and 22; in the embodiment 20, which is a preferred form of this invention, about one-half the volume of chamber 27 is in each respective half 21 and 22.

Within the assembly of half 21 and half 22 in die 20 between faces 21 and 22 are defined a plurality of longitudinally spaced, generally vertically extending channels 28. Each individual channel 28 extends between the forward end of region 31 and chamber 27 and the edge portion 26. The relationship between the individual channels 28 and the halves 21 and 22 is such that the side wall of each channel 28 is formed by each of halves 21 and 22. Preferably, about half of the side wall defining each channel 28 8s formed in each of the halves 21 and 22, though those skilled in the art will appreciate that, especially for reasons of manufacturing convenience, embodiments of this invention may be constructed so that more than half the side wall (and volume) of a given channel 28 may exist in a given one of the halves 21 or 22. Preferably, each channel 28 is so formed as to be in generally spaced, parallel relationship to adjacent channels 28, and all channels 28 are preferably so arranged as to be perpendicular to the edge portion 26. Preferably also, adjacent channels 28 are preferably equally spaced from one another. In general, the maximum cross-sectional area of an individual channel 28 ranges from about $6.4 \times 10^{-5}$ to $4.8 \times 10^{-4}$ square inches. Preferably, the cross sectional area of a given channel 28 as substantially constant along its entire length. Preferably all channels 28 in a die 20 have similar cross sectional configurations and equal cross-sectional areas.

In an assembled die 20, a layer 29 of bonding material exists between the adjoining halves which bonds the two halves 21 and 22 together around their abutting peripheries. The bonding material is adapted to bond the material comprising the halves so that the halves 21 and 22 are joined together at such abutting peripheral regions in sealed engagement. Thus, the halves 21 and 22 are joined together at their opposed, opposite end regions, as well as in the region between the die faces 23 and 24. In the latter region, the halves 21 and 22 are continuously joined by layer 29 in the area between the forward end of region 31 of chamber 27 and the edge region 26 except for the channels 28.

The halves 21 and 22 are each formed of conventional die-forming materials, such as steel, or the like. Suitable bonding material for a layer 29 can be metallic or organic in nature. Preferred metallic bonding agents include brazing compound silver solder, and similar metals which melt at temperatures below the melting temperatures of halves 21 and 22. Preferred organic bonding materials include heat-resistant thermosetting epoxy resins, and the like. Most preferred materials for a layer 29 are metallic.

The fabrication procedure used to bind halves 21 and 22 together will vary, being dependent upon the particular material used for layer 29, as those skilled in the art will appreciate. For example, a thin sheet of silver can be inserted between halves 21 and 22 and then halves 21 and 22 are heated while in a clamped configuration to a temperature above the melting point of the silver. The silver melts and bonds the halves together. In the region of each channel 28, the metal, apparently because of surface tension and other factors, generally leaves the channels 28 open and clear. Furnace brazing may be used for joining halves 21 and 22 together by a metallurgical bond using a nonferrous filler metal as the bonding material and a furnace as the heat source. The filler metal is preplaced on the abutting areas of halves 21 and 22 and is retained in position during the brazing. Furnace brazing is adopted for use in the present invention when using halves 21 and 22 formed of carbon and low-alloy steels and using a copper filler metal or a silver alloy filler metal. A suitable atmosphere in the brazing furnace is employed to protect the steel assemblies of halves 21 and 22 against oxidation, or oxidization and decarburization, during brazing and during cooling, which is accomplished in chambers adjacent to the brazing furnace. A suitable atmosphere also aids in wetting the joint surfaces by molten copper filler metal usually without use of a brazing flux. Copper is a preferred filler metal because of the low cost and the high strength of the joints produced. Common brazing temperatures range from 2,000° to 2,100°F.

Resistance brazing may also be employed. In such process the halves 21 and 22 are heated locally and filler metal preplaced between them is melted by the heat obtained from resistance to the flow of electric current through the electrodes and the work. The heating current is passed through the joint itself. Resistance welding equipment may be used.

Any convenient fabrication procedure may be used to bond the halves 21 and 22 together.

Machining processes used in the manufacture of a die 20 typically may include, for example, planing, shaping, trepanning, milling, grinding, and the like as those skilled in the art will appreciate. Many different fabrication procedures can be employed to produce a die 20. Indeed, one may desire to bond halves 21 and 22 together with a layer 29 after channels 28 are machined and before all the other various machining operations are completed. Channels 28 specifically may be formed by any one or more of such opeations—grinding, cylindrical grinding, honing, planing, plunge cutting, shaping, trepanning, electrical discharge grinding, electrochemical machining, and the like. Steel bar stock is a convenient starting material.

In a die 20, it is preferred to have the walls of each channel 28 as smooth as practical. Towards this end, for example, each half 21 and 22, after machining may be subjected to an electro-polishing procedure wherein the steel surfaces are smoothed anodically in a concentrated acid or alkaline solution. During this procedure, the products of anodic metal dissolution react with the electrolyte to form a film at the metal surface. Resistance to the flow of electric current is less at microprojections where the film is thinner than in the microdepressions. The result is more rapid dissolution of projections to cause microleveling of the surface. The ultimate result is that the surfaces in a half 21 or 22 so processed display so little scattering of incident light that polishing is accomplished and a glossy appearance is attained. By this way micro-roughness is removed.

Such electropolishing also is desirable when it is desired to electroface the opposed faces of halves 21 and 22 with a harder metal by electrolytic deposition, such as chromium or the like. Hard chromium plating improves resistance to wear, abrasion heat and/or corrosion, and is commonly deposited to thickness ranging from about 0.1 to 20 mils, although thicker and thinner such coatings may be employed on halves 21 and 22 without departing from the present invention. The hard chromium is usually directly applied to the basis metal and may subsequently be ground to a finish dimension.

Die 20 is mounted in apparatus used in the melt blown microfiber process in proximity to the head of an extruder (not shown). While any convenient mounting means and procedure may be employed, as those skilled in the art will appreciate, it is preferred to form in die 20 a pair of longitudinally extending channels 31 and 32, one in each of the halves 21 and 22, respectively. These channels permit one to readily mount and demount a die 20 from the head assembly of an extruder. Those skilled in the art will apreciate that any convenient mounting means and mounting procedure may be employed. In operation, a stream of relatively high velocity air travels adjacent each die face 23 and 24, respectively, towards edge portion 26 where the air streams collide with hot, thermoplastic polymer issuing from channels 28, as is usual in the melt blown microfiber process. The supporting structure for die 20, and also the structure defining the ducts for such high velocity air, is known generally to the prior art and does not form a part of the present invention as such.

The claims are:

1. A die adapted for the simultaneous extrusion of a plurality of longitudinally aligned filaments, said die comprising:

A. a pair of mating sections, each section being formed of metal, said sections defining together in an assembled configuration a longitudinally elongated assembly, B. said assembly defining exteriorly a pair of opposed, tapered die faces, one on each of said halves, said faces mating to define an angular edge portion, C. said assembly further defining therewithin a centrally disposed, longitudinally elongated chamber rearwardly opening, forwardly laterally tapered in said assembly, a portion of said chamber being in each of said sections, D. said assembly still further defining therewithin a plurality of longitudinally spaced, generally vertically extending channels, each channel extending between said chamber and said edge portion, each channel having an average cross sectional area along its length ranging from about $6.4 \times 10^{-5}$ to $4.8 \times 10^{-4}$ square inches, and E. a peripheral layer of bonding material between said sections bonding together said section in said assembled configuration located in opposed, abutting side regions therebetween and in abutting edge regions therebetween vertically between said channel and said forward edge portion and between said channels.

2. The die of claim 1 wherein said bonding material layer is metallic.

3. The die of claim 2 wherein said layer is produced by brazing.

4. The die of claim 1 wherein the walls of each channel are eletro-polished.

5. The die of claim 4 wherein the walls of each channel are chrome plated.

6. The die of claim 1 wherein each of said halves is substantially a mirror image of the other and almost one-half of the wall of each of said channels is defined by one of said halves.

7. The die of claim 1 wherein said channels are generally equally parallelly spaced from one another.

8. The die of claim 1 wherein said edge portion is straight and said channels are generally perpendicular thereto.

* * * * *